W. A. SCOTT.
TURBINE ENGINE.
APPLICATION FILED APR. 27, 1912.

1,047,898.

Patented Dec. 17, 1912.

WITNESSES

INVENTOR
William A. Scott

UNITED STATES PATENT OFFICE.

WILLIAM A. SCOTT, OF SEATTLE, WASHINGTON, ASSIGNOR TO AMERICAN TURBINE COMPANY, INC., OF SEATTLE, WASHINGTON, A CORPORATION OF WASHINGTON.

TURBINE-ENGINE.

1,047,898.   Specification of Letters Patent.   Patented Dec. 17, 1912.

Application filed April 27, 1912. Serial No. 693,712.

*To all whom it may concern:*

Be it known that I, WILLIAM A. SCOTT, a citizen of the United States, residing at Seattle, in the county of King and State of Washington, have invented certain new and useful Improvements in Turbine-Engines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in turbine engines, designed for use as motive power under force imparted to the rotor by impact, adhesion, viscosity and static expansion derived from fluid, such as gas, ether, steam or water, the object in view being to provide an engine whereby the highest possible economy may be obtained at a minimum of energy.

The present invention comprises essentially an engine provided with rotor blades or plates having circumferential teeth adapted to receive the direct impact of the fluid as well as the faces of the disk receiving the impact of the fluid, thereby resulting in a higher starting torque and increased power at all speeds.

The invention comprises various details of construction and combinations and arrangements of parts which will be hereinafter fully described, shown in the accompanying drawings and then specifically defined in the appended claims.

I illustrate my invention in the accompanying drawings, in which:—

Figure 1:
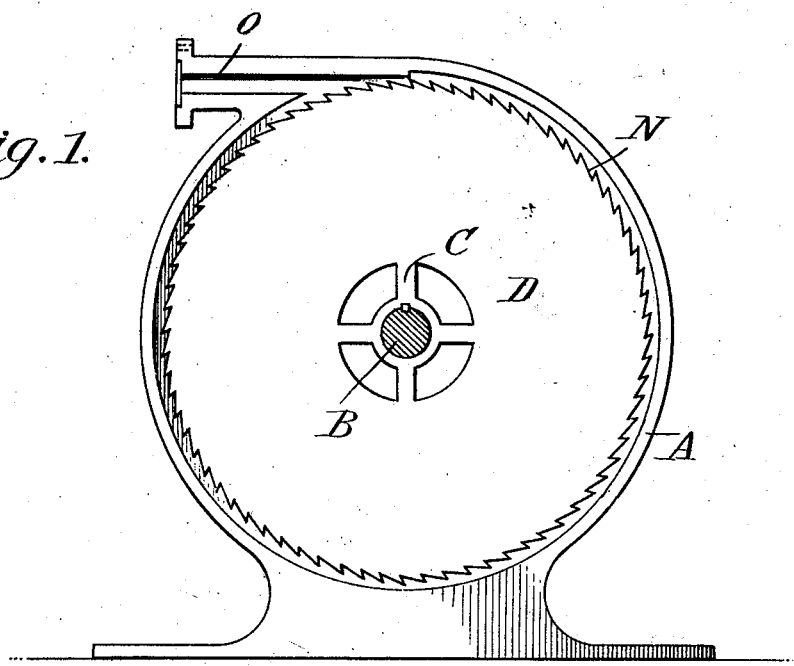
Figure 2:
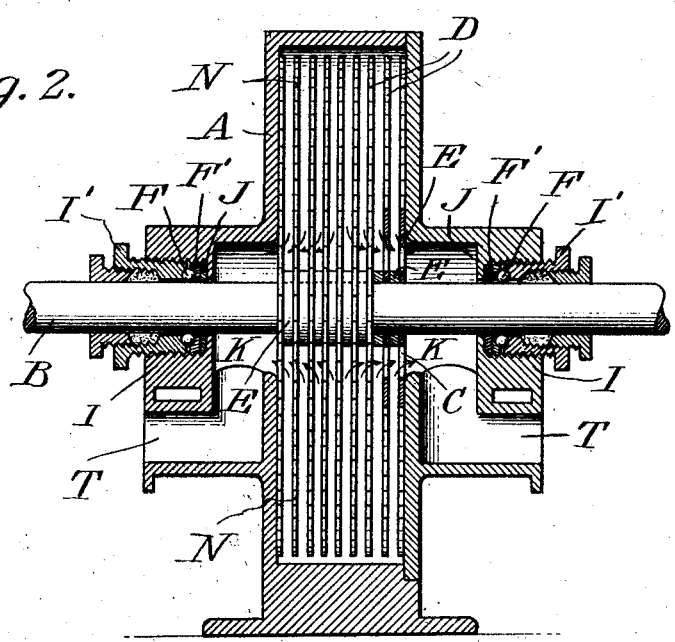

Figure 1 is a vertical central sectional view through my improved turbine, and Fig. 2 is a section at right angles to the plane shown in Fig. 1.

Reference now being had to the details of the drawings by letter, A designates the casing in which a shaft B is journaled in suitable ball bearings F which are held against the races F' by the threaded bearing plugs I, a suitable packing J being interposed between the race F' and a shoulder formed at the inner end of the recess in which the race and bearing plug are mounted. A gland I' is circumferentially threaded and fitted within the bearing member I.

Fixed to the shaft by means of spider arms C is a series of disks D, which are spaced apart a suitable distance by means of washers E or other means, and the circumference of each disk is provided with a series of serrations or teeth N adapted to receive the impact of fluid introduced through the inlet O. Said casing is provided with a chamber K at each end of the series of disks and exhaust ports T lead from the opposite ends of the chamber through which the fluid may make exit.

In operation, the fluid being introduced through the inlet port O will be directed against the serrations about the circumferences of the disks, thus imparting a propulsive force thereto and the impact of the fluid against the faces of the disks taking a spiral course, the length of the spiral corresponding to the speed of rotation of the plates. By reason of the direct impact upon the disks together with the adhesion of the fluid to the disks, a high starting torque will result and a corresponding increase of power will be obtained at different speeds.

What I claim to be new is:—

1. A turbine engine comprising a casing having inlet and exhaust ports, a shaft journaled in said casing, a series of disks fitted to said shaft and spaced apart, the circumference of each disk being serrated, as set forth.

2. A turbine engine comprising a casing having inlet and exhaust ports, a shaft journaled in said casing, a series of disks fixed to said shaft and spaced apart, each disk mounted upon spider arms, the circumference of the disks being serrated, the spaces between the disks communicating with one another and with said exhaust ports, as set forth.

3. A turbine engine comprising a casing having inlet and exhaust ports, a shaft journaled in suitable bearings in said casing, disks fitted to said shaft and spaced apart adapted to rotate in an enlarged portion of
5 the casing, the circumference of said disks being serrated, said casing having chambers at the ends of the series of disks and communicating with the spaces intermediate the disks and with the exhaust ports, as set forth.

In testimony whereof I hereunto affix my 10 signature in the presence of two witnesses.

WILLIAM A. SCOTT.

Witnesses:
A. VAN SCHAICH,
J. L. WALLER.